Figure 1:
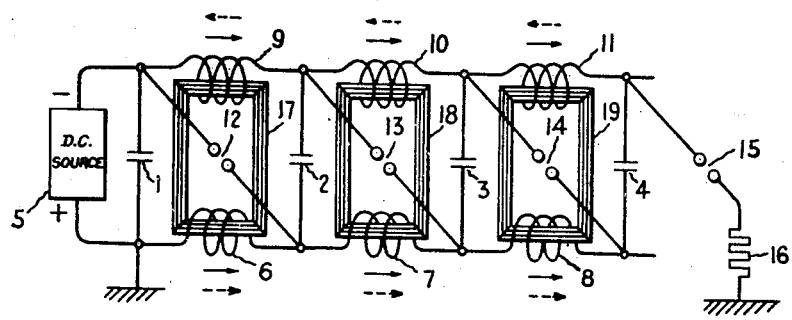

June 15, 1948.  K. J. R. WILKINSON  2,443,488
PULSED NETWORK
Filed May 18, 1945

Inventor:
Kenneth J. R. Wilkinson,
by Harry E. Dunham
His Attorney.

Patented June 15, 1948

2,443,488

UNITED STATES PATENT OFFICE 2,443,488

PULSED NETWORK

Kenneth J. R. Wilkinson, Rugby, England, assignor to General Electric Company, a corporation of New York Application May 18, 1945, Serial No. 594,555
In Great Britain June 13, 1944

7 Claims. (Cl. 171—97)

My invention relates to pulse-forming networks and, more particularly, to networks wherein recurrent voltage pulses are generated by charging in parallel a plurality of capacitors and discharging the capacitors in series to generate pulses.

The charging of such capacitors in parallel is frequently effected through resistances interconnecting the capacitors, but it is often necessary to replace the resistances by inductors in cases in which the unavoidable energy loss within the resistances is undesirable. However, when inductors are used for charging, a certain amount of energy is stored in the inductors during the short interval in which the capacitors discharge to form the pulse, and the energy so stored continues to circulate current after the pulse has occurred. It is found, particularly in high power multistage networks, that this training edge current, though small relative to the pulse current, delays deionization of the discharge devices in the series discharge circuit, and, as a limiting condition, tends to cause a short circuit of the charging source.

Deionization of a spark gap or the like is aided by reduction in amplitude of the voltage which appears across the gap at the moment of arc extinction. It has been suggested that this restriking voltage can be reduced by connecting a resistor in parallel with each inductor. However, such resistors again introduce an unavoidable energy loss into the system.

Accordingly, it is a principal object of my invention to provide means whereby the deionization of each discharge device is assisted without undue wastage of energy and without impairing the charging characteristics of the network.

It is a further object of my invention to provide, in a pulse-forming network of the character described, means for reducing the energy stored in the charging inductors during formation of each pulse without adversely affecting the charging characteristics of the network.

It is a still further object of my invention to provide, in a pulse-forming network of the above character, means for minimizing the inductance of the charging inductors during capacitor charging operation and substantially increasing this inductance during capacitor discharging operation, thereby to permit rapid capacitor charging and abrupt pulse termination.

In accordance with my invention, pairs of charging inductors, connected to capacitor terminals of opposite polarity, are magnetically coupled, as by winding upon an iron core or the like, and are so oriented with respect to each other that charging currents through the coupled inductors tend to establish opposing fluxes, while currents induced during pulse formation augment each other. Accordingly, therefore, the effective inductance during charging is the small leakage or short-circuit inductance, whereas the effective inductance during pulse formation is the larger magnetizing inductance.

Figure 2:
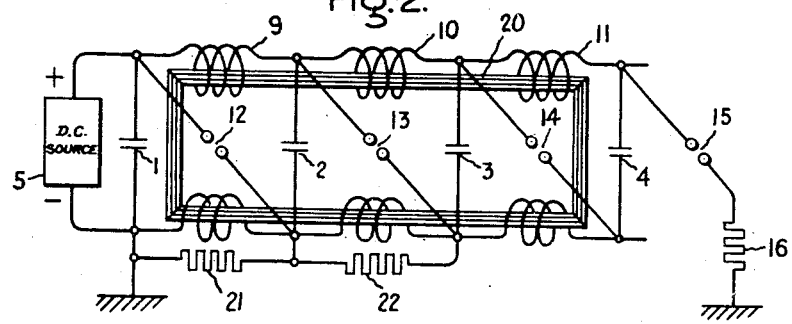
Figure 3:
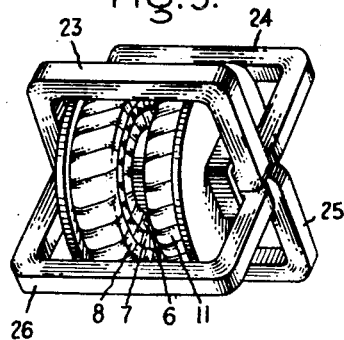

My invention will be more fully understood and its objects and advantages further appreciated by referring now to the following detailed specification taken in conjunction with the accompanying drawing, in which Figs. 1 and 2 are schematic circuit diagrams of pulse-forming networks illustrating various embodiments of my invention, and Fig. 3 is a perspective view of an iron core induction apparatus or transformer suitable for use in connection with the embodiment of the invention illustrated schematically at Fig. 2.

Referring now to the drawing, and more particularly to Fig. 1, I have shown a pulse-forming network comprising a plurality of capacitors 1, 2, 3, and 4 connected in parallel circuit relation to a source 5 of unidirectional current supply through a plurality of inductors 6, 7, 8, 9, 10, and 11. A plurality of spark discharge gaps 12, 13, 14, and 15 are arranged to connect the capacitors 1, 2, 3, and 4 in series circuit relation for discharge through a load circuit illustrated schematically as a resistor 16. The series discharge circuit is completed through ground from one terminal of the resistor 16 to one terminal of the capacitor 1.

In accordance with my invention, energy storage in the inductors during pulse formation is minimized by providing mutual magnetic coupling between each inductor connecting positive terminals of a pair of condensers and the inductor connecting negative terminals of the same condensers. For example, the inductors 9 and 6, joining the positive and negative terminals, respectively, of the condensers 1 and 2 are wound upon a common iron core 17. Similarly, the inductors 10 and 7 are wound upon a core 18 and the inductors 11 and 8 are wound upon a core 19. The inductors are so oriented upon the cores 17, 18, and 19 that opposing fluxes are established in each core by the charging current in the inductors on that core. With such an arrangement, aiding fluxes are established by the inductors upon each core during discharge of the capacitors, thereby to increase the inductance of, and minimize the energy storage in, the inductors during pulse discharge intervals.

In operation, the capacitors 1, 2, 3, and 4 of Fig. 1 are first charged from the source 5 with the spark gaps 12, 13, 14, and 15 non-conductive. During this charging interval, the fluxes established by the inductors are in opposing relation in each of the cores 17, 18, and 19, as indicated by the full line arrows of Fig. 1. Accordingly, the charging inductance of each coil 6–11, inclusive, is the relatively low leakage inductance. The charging operation is thereby facilitated. When the capacitor voltage becomes sufficiently high to break down the gaps 12—15, or when the gaps are triggered by other means, the capacitors 1-4, inclusive, are connected in series circuit relation for discharge through the load resistor 16. During such discharge, the inductors 6-11, inclusive, serve to prevent short-circuiting of the capacitors. The capacitor potentials, however, are impressed upon the inductors with such polarity that currents set up in the inductors during pulse discharge establish aiding fluxes in each of the cores 17, 18, and 19, as indicated by the broken line arrows of Fig. 1. Accordingly, therefore, during the pulse forming or discharge intervals, the inductance of each coil 6-11, inclusive, is the mutual or magnetizing inductance and is appreciably larger than the inductance of the same coil during the charging interval. The large inductance thus presented to pulse currents prevents the establishment of large currents in the inductances and minimizes the energy stored therein during pulse discharge. Rapid deionization of the gaps 12-15, inclusive, at the termination of each pulse discharge is thereby ensured.

Instead of using a separate iron core magnetically to couple each pair of inductors independently of the other pairs, all the inductors may be wound upon a common iron core 20 in the manner illustrated at Fig. 2. At Fig. 2, I have shown also how the restriking voltage at pulse termination may be further minimized by connecting resistors, such as 21 and 22, in parallel circuit relation with the inductors.

One construction of an iron core suitable for carrying out my invention is illustrated at Fig. 3. In this construction four strip-wound core sections 23, 24, 25, and 26 are arranged to provide a common central core or limb upon which the inductances 6-11, inclusive, are wound. Preferably, the inductance coils 6, 7, and 8 are wound concentrically and disposed on one end of the central core, while the inductance coils 9, 10, and 11 are wound concentrically and disposed upon the opposite end of the central core, the coils 6 and 9 being at the center next to the core.

While I have shown and described only certain preferred embodiments of my invention by way of illustration, many modifications will occur to those skilled in the art, and I therefore wish to have it understood that I intend in the appended claims to cover all such modifications as fall within the true spirit and scope of my invention.

What I claim as new and desire to secure by Letters Patent of the United States, is:

1. A pulse forming network comprising a plurality of capacitors, a plurality of inductors connecting said capacitors to a source of unidirectional electric current supply for charging in parallel circuit relation, means connecting said capacitors in series circuit relation for discharge through a load circuit, and means for mutually coupling inductors connected in the charging circuit of each capacitor on opposite sides thereof.

2. A pulse-forming network comprising a plurality of capacitors, a plurality of inductors connecting said capacitors to a source of unidirectional current supply for charging in parallel circuit relation, a plurality of discharge devices connecting said capacitors in series circuit relation for discharge through a load circuit, and means for magnetically coupling said inductors so that charging currents in inductors connected to positive capacitor terminals are in opposing flux relation to inductors connected to negative capacitor terminals.

3. A pulse-forming network comprising a plurality of capacitors, a plurality of inductors connecting said capacitors to a source of unidirectional current supply for charging in parallel circuit relation, a plurality of discharge devices connecting said capacitors in series circuit relation for discharge through a load circuit, and means for mutually coupling pairs of said inductors so that discharge currents in inductors connected to capacitor terminals of one polarity are in aiding flux relation with discharge currents in inductors connected to capacitor terminals of opposite polarity.

4. A pulse-forming network comprising a plurality of capacitors, a plurality of inductors connecting said capacitors to a source of unidirectional current supply for charging in parallel circuit relation, a plurality of spark gaps connecting said capacitors in series circuit relation for discharge through a load circuit, and low reluctance means magnetically coupling pairs of said inductors connected to capacitor terminals of opposite polarity between each pair of capacitors in such manner that mutual coupling between said pairs of inductors is minimized during charging operation and substantial during pulse discharge through said gaps.

5. An electric pulse-forming network comprising a plurality of capacitors, a plurality of inductors connecting said capacitors in parallel circuit relation to a source of unidirectional charging potential, a plurality of spark gaps connecting said capacitors for discharge in series circuit relation with a load circuit, and means for minimizing energy storage in said inductors during discharge of said capacitors comprising low reluctance means magnetically coupling inductors connected to capacitor terminals of opposite polarity between each pair of capacitors so that discharge currents through said inductors are in aiding flux relation.

6. An electric pulse-forming network comprising a plurality of capacitors, a plurality of inductors connecting said capacitors in parallel circuit relation to a source of unidirectional charging potential, a plurality of spark gaps connecting said capacitors for discharge in series circuit relation with a load circuit, and means for minimizing energy storage in said inductors during discharge of said capacitors comprising low reluctance means magnetically coupling pairs of inductors connected between opposite terminals of each pair of capacitors in such manner that discharge currents in said coupled pairs of inductors are in aiding relation.

7. An electric pulse-forming network comprising a plurality of capacitors, a plurality of inductors connecting said capacitors in parallel circuit relation to a source of unidirectional charging potential, a plurality of spark gaps connecting said capacitors for discharge in series circuit relation with a load circuit, and common low reluctance means magnetically coupling all said inductors so that charging current in inductors connected to capacitor terminals of one polarity is in opposing flux relation with charging current in inductors connected to capacitor terminals of opposite polarity, whereby pulse discharge current in said inductors is in aiding flux relation thereby to minimize energy storage in said inductors during discharge of said capacitors.

KENNETH J. R. WILKINSON.